United States Patent
Bondesen et al.

(10) Patent No.: US 9,424,572 B2
(45) Date of Patent: Aug. 23, 2016

(54) ONLINE BANKING DIGITAL WALLET MANAGEMENT

(71) Applicant: BANK OF AMERICA CORPORATION, Charlotte, NC (US)

(72) Inventors: Laura Corinne Bondesen, Charlotte, NC (US); Jason P. Blackhurst, Charlotte, NC (US); Scott Lee Harkey, Concord, NC (US); William Blakely Belchee, Charlotte, NC (US); Tammy L. Brunswig, Fort Mill, SC (US)

(73) Assignee: Bank of America Corporation, Charlotte, NC (US)

( * ) Notice: Subject to any disclaimer, the term of this patent is extended or adjusted under 35 U.S.C. 154(b) by 8 days.

(21) Appl. No.: 14/196,383

(22) Filed: Mar. 4, 2014

(65) Prior Publication Data

US 2015/0254638 A1     Sep. 10, 2015

(51) Int. Cl.
| | |
|---|---|
| *G06Q 40/00* | (2012.01) |
| *G06Q 20/36* | (2012.01) |
| *G06Q 20/22* | (2012.01) |
| *G06Q 20/38* | (2012.01) |

(52) U.S. Cl.
CPC ............ *G06Q 20/363* (2013.01); *G06Q 20/227* (2013.01); *G06Q 20/36* (2013.01); *G06Q 20/3672* (2013.01); *G06Q 20/3674* (2013.01); *G06Q 20/3821* (2013.01); *G06Q 2220/00* (2013.01)

(58) Field of Classification Search
USPC ........................ 705/35, 39, 40, 41, 64–67, 76
See application file for complete search history.

(56) References Cited

U.S. PATENT DOCUMENTS

| | | |
|---|---|---|
| 4,766,293 A | 8/1988 | Boston |
| 5,438,186 A | 8/1995 | Nair et al. |
| 6,119,103 A | 9/2000 | Basch et al. |
| 6,254,000 B1 | 7/2001 | Degen et al. |
| 6,330,546 B1 | 12/2001 | Gopinathan et al. |
| 6,516,056 B1 | 2/2003 | Justice et al. |
| 6,658,393 B1 | 12/2003 | Basch et al. |
| 6,718,328 B1 | 4/2004 | Norris |
| 7,136,835 B1 | 11/2006 | Flitcroft et al. |
| 7,177,838 B1 | 2/2007 | Ling |
| 7,328,189 B2 | 2/2008 | Ling |

(Continued)

FOREIGN PATENT DOCUMENTS

| | | |
|---|---|---|
| WO | WO 2012058099 | 5/2012 |
| WO | WO 2013095486 | 6/2013 |

OTHER PUBLICATIONS

Simon, "Credit-Card Reward Programs: A Short History"; Creditcards.com, Nov. 2006, 4 pages.

(Continued)

*Primary Examiner* — Lalita M Hamilton
(74) *Attorney, Agent, or Firm* — Michael A. Springs; Moore & Van Allen PLLC; Patrick B. Horne

(57) ABSTRACT

Embodiments are directed to digital wallet management. Embodiments initiate presentation of a digital wallet management interface, comprising initiating presentation of at least one digital wallet; and initiating presentation of at least one representation of at least one payment credential and at least one indication of which of the at least one digital wallets are associated with each of the at least one payment credentials.

20 Claims, 8 Drawing Sheets

(56) References Cited

U.S. PATENT DOCUMENTS

| | | |
|---|---|---|
| 7,337,144 B1 | 2/2008 | Blinn et al. |
| 7,398,250 B2 | 7/2008 | Blinn et al. |
| 7,596,530 B1 * | 9/2009 | Glasberg .................. 705/64 |
| 7,606,560 B2 | 10/2009 | Labrou et al. |
| 7,610,040 B2 | 10/2009 | Cantini et al. |
| 7,657,489 B2 | 2/2010 | Stambaugh |
| 7,693,771 B1 | 4/2010 | Zimmerman et al. |
| 7,698,221 B2 | 4/2010 | Blinn et al. |
| 7,739,169 B2 | 6/2010 | Hammad |
| 7,742,967 B1 | 6/2010 | Keresman, III et al. |
| 7,784,684 B2 | 8/2010 | Labrou et al. |
| 7,848,980 B2 | 12/2010 | Carlson |
| 7,992,779 B2 | 8/2011 | Phillips et al. |
| 8,032,932 B2 | 10/2011 | Speyer et al. |
| 8,171,531 B2 | 5/2012 | Buer |
| 8,249,805 B2 | 8/2012 | de Silva et al. |
| 8,307,413 B2 | 11/2012 | Smadja et al. |
| 8,327,428 B2 | 12/2012 | Bailey et al. |
| 8,327,429 B2 | 12/2012 | Speyer et al. |
| 8,346,666 B2 | 1/2013 | Lindelsee et al. |
| 8,380,177 B2 | 2/2013 | Laracey |
| 8,395,242 B2 | 3/2013 | Oliver et al. |
| 8,407,142 B1 | 3/2013 | Griggs |
| 8,423,466 B2 | 4/2013 | Lanc |
| 8,498,940 B2 | 7/2013 | Pelegero et al. |
| 8,522,039 B2 | 8/2013 | Hyndman et al. |
| 8,572,689 B2 | 10/2013 | Radhakrishnan |
| 8,577,804 B1 | 11/2013 | Bacastow |
| 8,583,498 B2 | 11/2013 | Fried et al. |
| 8,584,251 B2 | 11/2013 | McGuire et al. |
| 8,589,271 B2 | 11/2013 | Evans |
| 8,590,008 B1 | 11/2013 | Ellmore |
| 8,595,812 B2 | 11/2013 | Bomar et al. |
| 8,620,790 B2 | 12/2013 | Priebatsch |
| 8,682,802 B1 | 3/2014 | Kannanari |
| 8,788,333 B2 | 7/2014 | Alba et al. |
| 8,788,429 B2 | 7/2014 | Ticken |
| 8,789,162 B2 | 7/2014 | Radhakrishnan |
| 8,839,383 B2 | 9/2014 | Van Horn |
| 8,943,574 B2 | 1/2015 | Bailey et al. |
| 8,985,442 B1 | 3/2015 | Zhou et al. |
| 8,996,423 B2 | 3/2015 | Johnson et al. |
| 9,055,053 B2 | 6/2015 | Radhakrishnan et al. |
| 9,069,943 B2 | 6/2015 | Radhakrishnan et al. |
| 2003/0004866 A1 | 1/2003 | Huennekens et al. |
| 2003/0061170 A1 | 3/2003 | Uzo |
| 2003/0105714 A1 | 6/2003 | Alarcon-Luther et al. |
| 2003/0163787 A1 | 8/2003 | Hay et al. |
| 2005/0222961 A1 | 10/2005 | Staib et al. |
| 2006/0287004 A1 | 12/2006 | Fuqua |
| 2007/0055594 A1 | 3/2007 | Rivest et al. |
| 2008/0109319 A1 | 5/2008 | Foss |
| 2008/0162338 A1 | 7/2008 | Samuels et al. |
| 2008/0162589 A1 | 7/2008 | Rodeheffer et al. |
| 2008/0189210 A1 | 8/2008 | Sawhney |
| 2008/0195499 A1 | 8/2008 | Meredith et al. |
| 2009/0002630 A1 | 1/2009 | Lacombe et al. |
| 2009/0006230 A1 | 1/2009 | Lyda et al. |
| 2009/0057396 A1 | 3/2009 | Barbour et al. |
| 2009/0119190 A1 * | 5/2009 | Realini .................. 705/30 |
| 2009/0164327 A1 | 6/2009 | Bishop et al. |
| 2010/0036741 A1 | 2/2010 | Cleven |
| 2010/0241571 A1 | 9/2010 | McDonald |
| 2010/0268645 A1 | 10/2010 | Martino et al. |
| 2010/0312636 A1 | 12/2010 | Coulter et al. |
| 2011/0022483 A1 | 1/2011 | Hammad |
| 2011/0166992 A1 | 7/2011 | Dessert et al. |
| 2011/0218907 A1 | 9/2011 | Dessert et al. |
| 2011/0251892 A1 | 10/2011 | Laracey |
| 2011/0277016 A1 | 11/2011 | Hockings et al. |
| 2012/0030047 A1 | 2/2012 | Fuentes et al. |
| 2012/0158540 A1 | 6/2012 | Ganti et al. |
| 2012/0158586 A1 | 6/2012 | Ganti et al. |
| 2012/0166334 A1 * | 6/2012 | Kimberg et al. ............. 705/44 |
| 2012/0179558 A1 | 7/2012 | Fischer |
| 2012/0197794 A1 | 8/2012 | Grigg et al. |
| 2012/0203700 A1 | 8/2012 | Ornce et al. |
| 2012/0252365 A1 | 10/2012 | Lam |
| 2012/0271712 A1 | 10/2012 | Katzin et al. |
| 2012/0290482 A1 | 11/2012 | Atef et al. |
| 2012/0316992 A1 | 12/2012 | Oborne |
| 2012/0317034 A1 | 12/2012 | Guha et al. |
| 2012/0323783 A1 | 12/2012 | Canetto |
| 2012/0330846 A1 | 12/2012 | Light et al. |
| 2013/0013499 A1 * | 1/2013 | Kalgi .................. 705/41 |
| 2013/0018738 A1 | 1/2013 | Faires et al. |
| 2013/0024360 A1 | 1/2013 | Ballout |
| 2013/0036048 A1 | 2/2013 | Campos et al. |
| 2013/0054336 A1 | 2/2013 | Graylin |
| 2013/0054470 A1 | 2/2013 | Campos et al. |
| 2013/0085927 A1 | 4/2013 | Scott |
| 2013/0110658 A1 | 5/2013 | Lyman et al. |
| 2013/0124346 A1 | 5/2013 | Baldwin et al. |
| 2013/0159178 A1 | 6/2013 | Colon et al. |
| 2013/0166332 A1 * | 6/2013 | Hammad .................. 705/5 |
| 2013/0179341 A1 * | 7/2013 | Boudreau .................. 705/41 |
| 2013/0191227 A1 * | 7/2013 | Pasa et al. .................. 705/14.73 |
| 2013/0204775 A1 | 8/2013 | Midkiff et al. |
| 2013/0204787 A1 | 8/2013 | Dubois |
| 2013/0212019 A1 | 8/2013 | Mattsson et al. |
| 2013/0246258 A1 | 9/2013 | Dessert |
| 2013/0246260 A1 | 9/2013 | Barten et al. |
| 2013/0254052 A1 | 9/2013 | Royyuru et al. |
| 2013/0254115 A1 | 9/2013 | Pasa et al. |
| 2013/0262315 A1 | 10/2013 | Hruska |
| 2013/0268437 A1 | 10/2013 | Desai et al. |
| 2013/0304651 A1 * | 11/2013 | Smith .................. 705/67 |
| 2013/0346302 A1 * | 12/2013 | Purves et al. .................. 705/40 |
| 2014/0006273 A1 | 1/2014 | Gopinath et al. |
| 2014/0012647 A1 | 1/2014 | Hecht |
| 2014/0025581 A1 | 1/2014 | Calman |
| 2014/0025958 A1 | 1/2014 | Calman |
| 2014/0143145 A1 | 5/2014 | Kortina |
| 2014/0188719 A1 | 7/2014 | Poornachandran et al. |
| 2014/0214640 A1 | 7/2014 | Mallikarjunan et al. |
| 2014/0244493 A1 * | 8/2014 | Kenyon et al. .................. 705/41 |
| 2014/0279476 A1 | 9/2014 | Hua |
| 2014/0279554 A1 | 9/2014 | Priebatsch et al. |
| 2014/0279566 A1 | 9/2014 | Verma et al. |
| 2014/0330721 A1 | 11/2014 | Wang |
| 2014/0337175 A1 * | 11/2014 | Katzin et al. .................. 705/26.62 |
| 2015/0019317 A1 * | 1/2015 | Mitchell .................. 705/14.27 |
| 2015/0019439 A1 | 1/2015 | Phillips |
| 2015/0032627 A1 | 1/2015 | Dill et al. |
| 2015/0046339 A1 * | 2/2015 | Wong .................. G06Q 20/382 705/71 |
| 2015/0081557 A1 | 3/2015 | Kinfoil et al. |
| 2015/0081567 A1 | 3/2015 | Boyle et al. |
| 2015/0100495 A1 | 4/2015 | Salama et al. |
| 2015/0120569 A1 | 4/2015 | Belshe et al. |
| 2015/0206137 A1 | 7/2015 | Mazarim Fernandes |
| 2015/0220914 A1 * | 8/2015 | Purves et al. .................. 705/35 |
| 2015/0254052 A1 | 9/2015 | Clements et al. |
| 2015/0254653 A1 | 9/2015 | Bondesen et al. |
| 2015/0254664 A1 | 9/2015 | Bondesen et al. |

OTHER PUBLICATIONS

Lane, "History of APIs"; APIEvangelist.com; Dec. 2012, 11 pages.
European Patent Application No. 01400506 filed on Feb. 28, 2001, and printed as document No. EP 1132876 A2 entitled "Electronic Wallet System with Secure Inter-purse Operations" by inventor Tang-Talpin et al.

* cited by examiner

ONLINE BANKING DIGITAL WALLET MANAGEMENT

BACKGROUND

In the new technological age, the security of personal information, or the lack thereof, has become an issue that concerns many people. As a result, several business industries, such as financial institutions, have taken precautionary measures to ensure the safety and protection of their customers' information. This is typically accomplished by verifying a user's identity prior to transferring any personal information using an electronic means.

BRIEF SUMMARY

Embodiments of the invention are directed to an apparatus for digital wallet management, whereby the apparatus provides a user a comprehensive management platform for managing multiple digital wallets and their associated payment credentials, where the apparatus includes a memory; a processor; and a module stored in the memory, executable by the processor, and configured to initiate presentation of a digital wallet management interface, comprising initiating presentation of at least one digital wallet; and initiating presentation of at least one representation of at least one payment credential and at least one indication of which of the at least one digital wallets are associated with each of the at least one payment credentials.

In some embodiments, the at least one representation of the at least one payment credential comprises a graphical object representing the at least one payment credential; the at least one representation of the at least one digital wallet comprises a graphical object representing the at least one digital wallet; and the at least one indication comprises a graphical link between the graphical object representing the at least one payment credential and the graphical object representing the at least one digital wallet. In some such embodiments, the graphical link comprises an overlap of the graphical object representing the at least one payment credential with the graphical object representing the at least one digital wallet.

In some embodiments, the module is further configured to receive user input selecting one of the at least one representations of the at least one payment credentials; and receive user input selecting one of the at least one digital wallets for association with the selected at least one payment credential. In some such embodiments, the module is further configured to initiate presentation of the selected payment credential and the selected digital wallet and at least one indication of association between the selected payment credential and the selected digital wallet.

In some embodiments, the module is further configured to receive user input setting a usage limit for one of the at least one digital wallets. In some such embodiments, the usage limit is a threshold spending limit for an aggregation of all the payment credentials associated with the digital wallet. In other such embodiments, the usage limit is a threshold spending limit to be applied to each of the payment credentials associated with the digital wallet individually.

In some embodiments, the usage limit is a threshold number of transactions for an aggregation of all the payment credentials associated with the digital wallet.

In some embodiments, the usage limit is a threshold number of transactions applied to each of the payment credentials associated with the digital wallet individually.

In some embodiments, the usage limit is a timing limit to be applied to an aggregation of all the payment credentials associated with the digital wallet.

In some embodiments, the usage limit is a timing limit to be applied to each of the payment credentials associated with the digital wallet.

In some embodiments, the interface is accessed by a customer authenticated through an online banking session administered by a financial institution also administering the digital wallet. In other embodiments, the interface is accessed by a customer authenticated through a mobile banking application session administered by a financial institution also administering the digital wallet.

According to embodiments of the invention, a method for digital wallet management whereby the apparatus provides a user a comprehensive management platform for managing multiple digital wallets and their associated payment credentials includes initiating presentation, by a processor, of a digital wallet management interface, comprising: initiating presentation of at least one digital wallet; and initiating presentation of at least one representation of at least one payment credential and at least one indication of which of the at least one digital wallets are associated with each of the at least one payment credentials.

In some embodiments, the at least one representation of the at least one payment credential comprises a graphical object representing the at least one payment credential; the at least one representation of the at least one digital wallet comprises a graphical object representing the at least one digital wallet; and the at least one indication comprises a graphical link between the graphical object representing the at least one payment credential and the graphical object representing the at least one digital wallet.

In some such embodiments, the graphical link comprises an overlap of the graphical object representing the at least one payment credential with the graphical object representing the at least one digital wallet.

According to embodiments of the invention, a computer program product for digital wallet management, whereby the apparatus provides a user a comprehensive management platform for managing multiple digital wallets and their associated payment credentials, the computer program product comprising a non-transitory computer-readable medium comprising code causing a first apparatus to: initiate presentation of a digital wallet management interface, comprising: initiating presentation of at least one digital wallet; and initiating presentation of at least one representation of at least one payment credential and at least one indication of which of the at least one digital wallets are associated with each of the at least one payment credentials.

In some embodiments, the at least one representation of the at least one payment credential comprises a graphical object representing the at least one payment credential; the at least one representation of the at least one digital wallet comprises a graphical object representing the at least one digital wallet; and the at least one indication comprises a graphical link between the graphical object representing the at least one payment credential and the graphical object representing the at least one digital wallet.

In some embodiments, the graphical link comprises an overlap of the graphical object representing the at least one payment credential with the graphical object representing the at least one digital wallet.

BRIEF DESCRIPTION OF THE DRAWINGS

Figure 1:
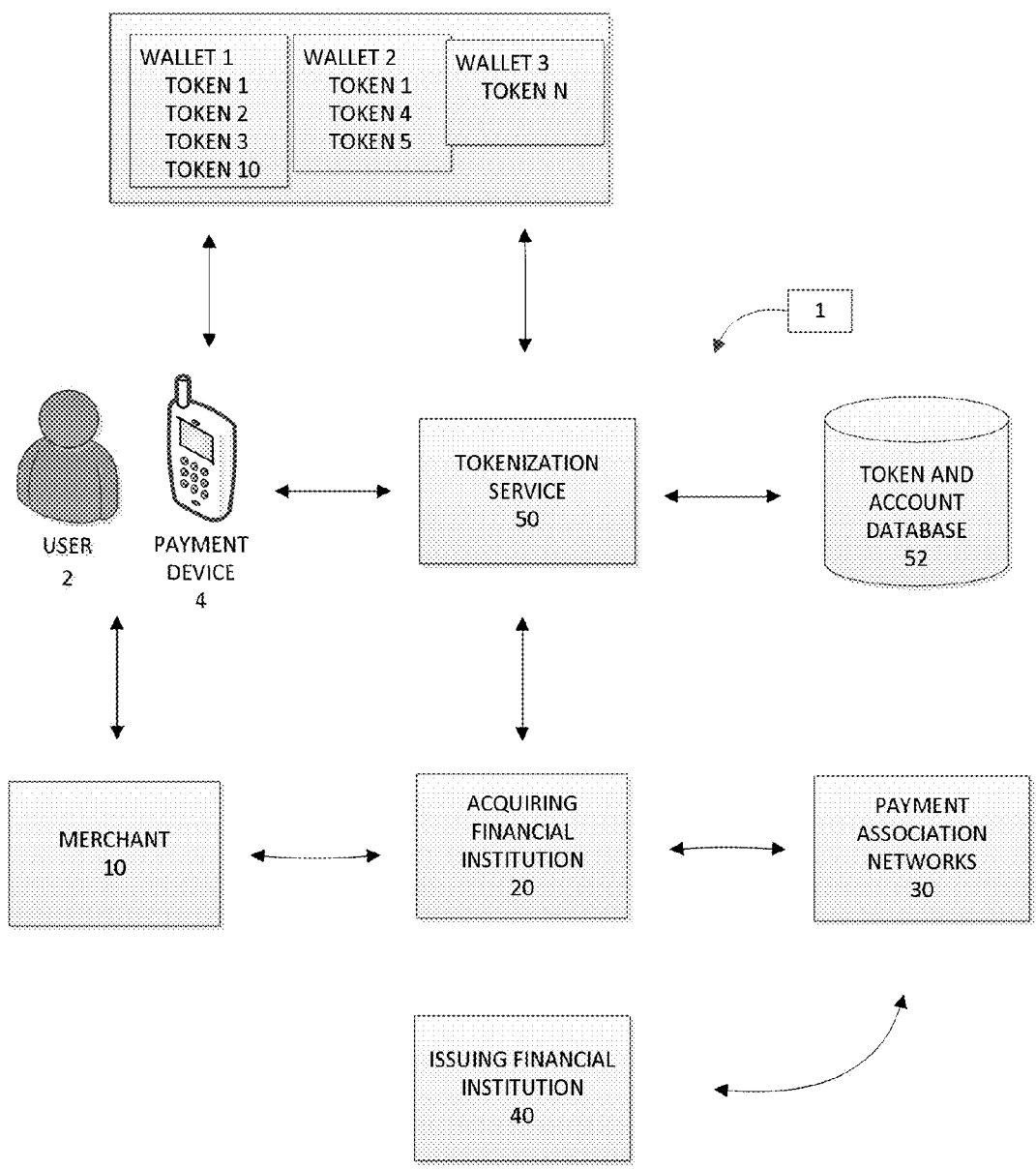
Figure 2:
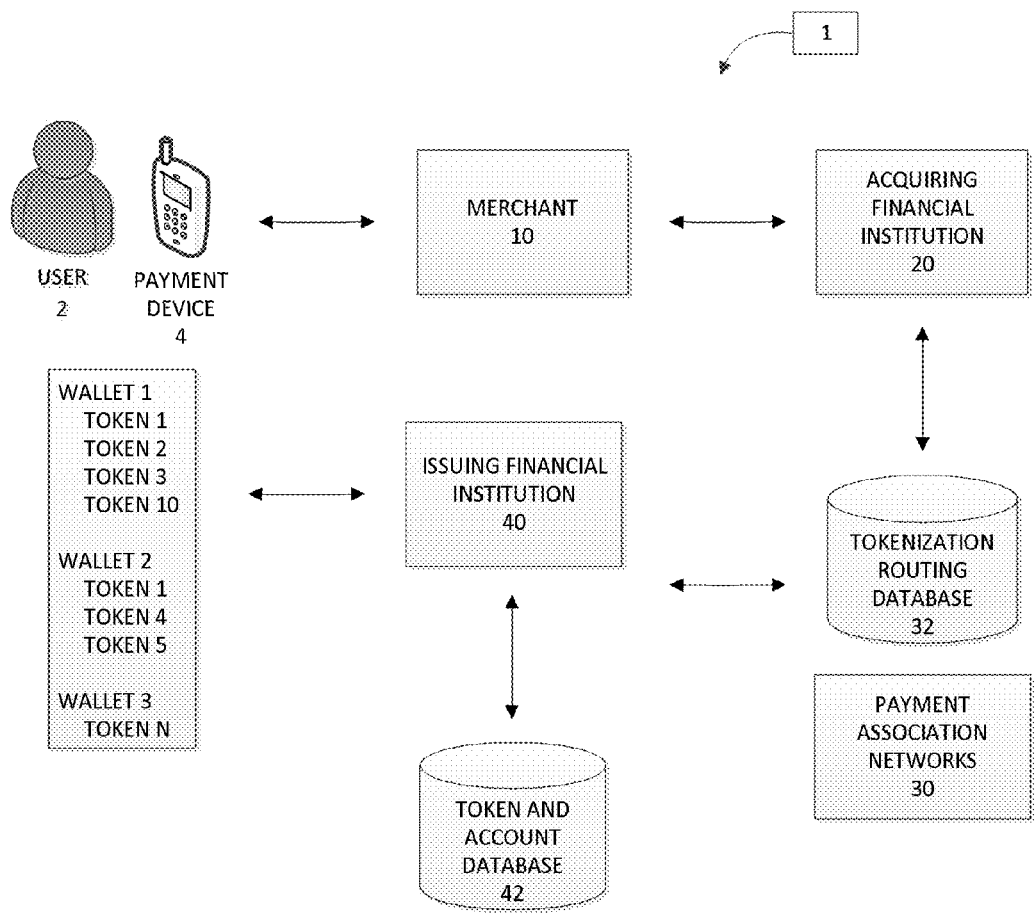
Figure 3:
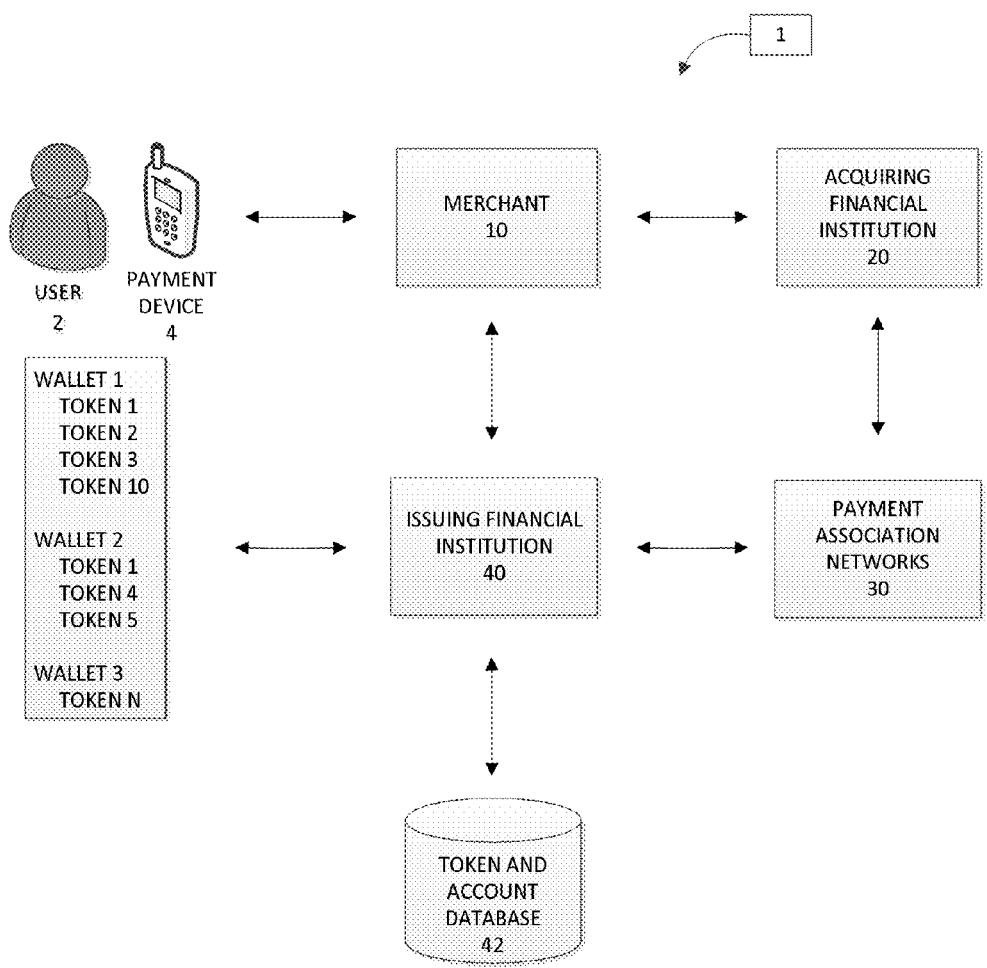
Figure 4:
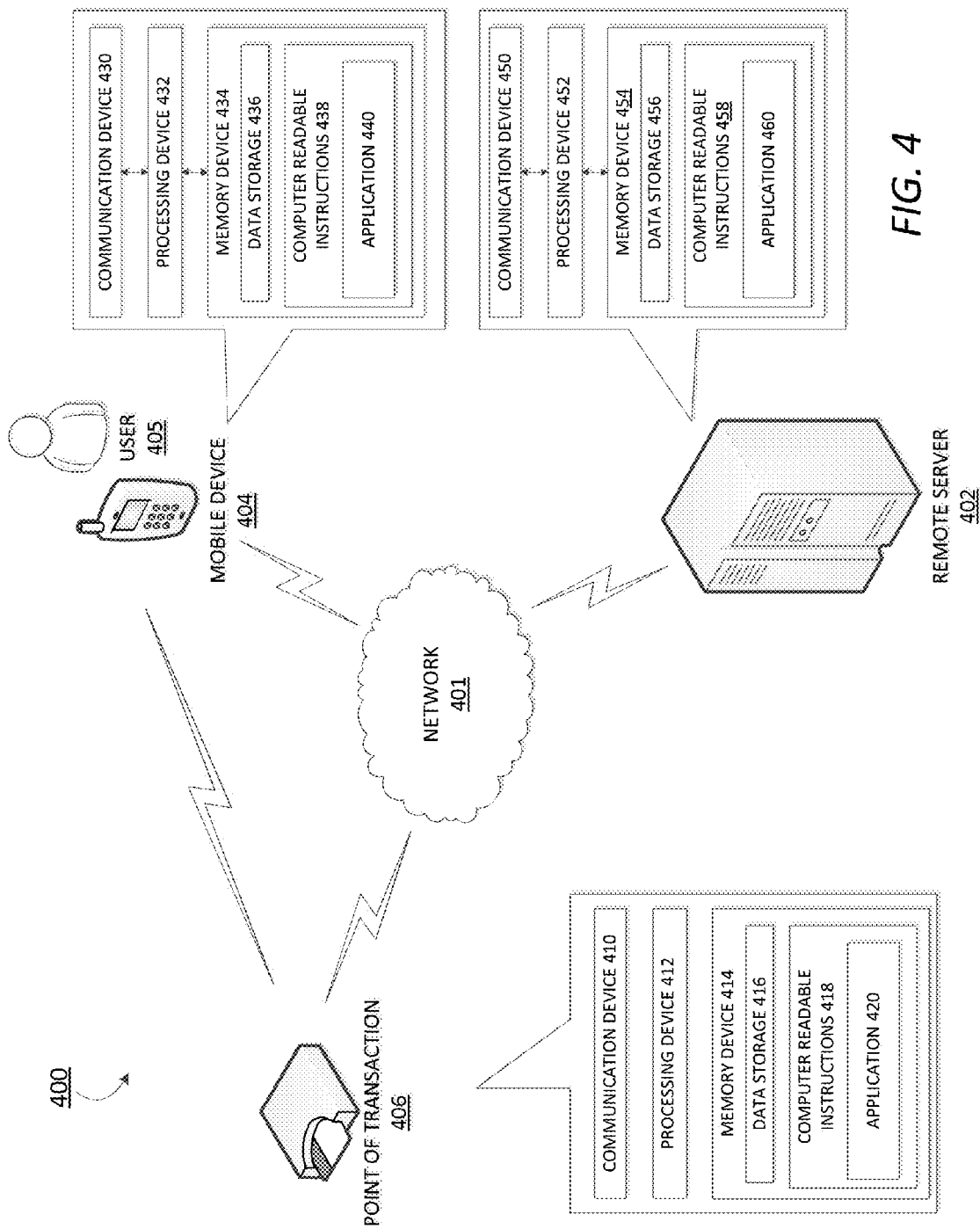
Figure 5:
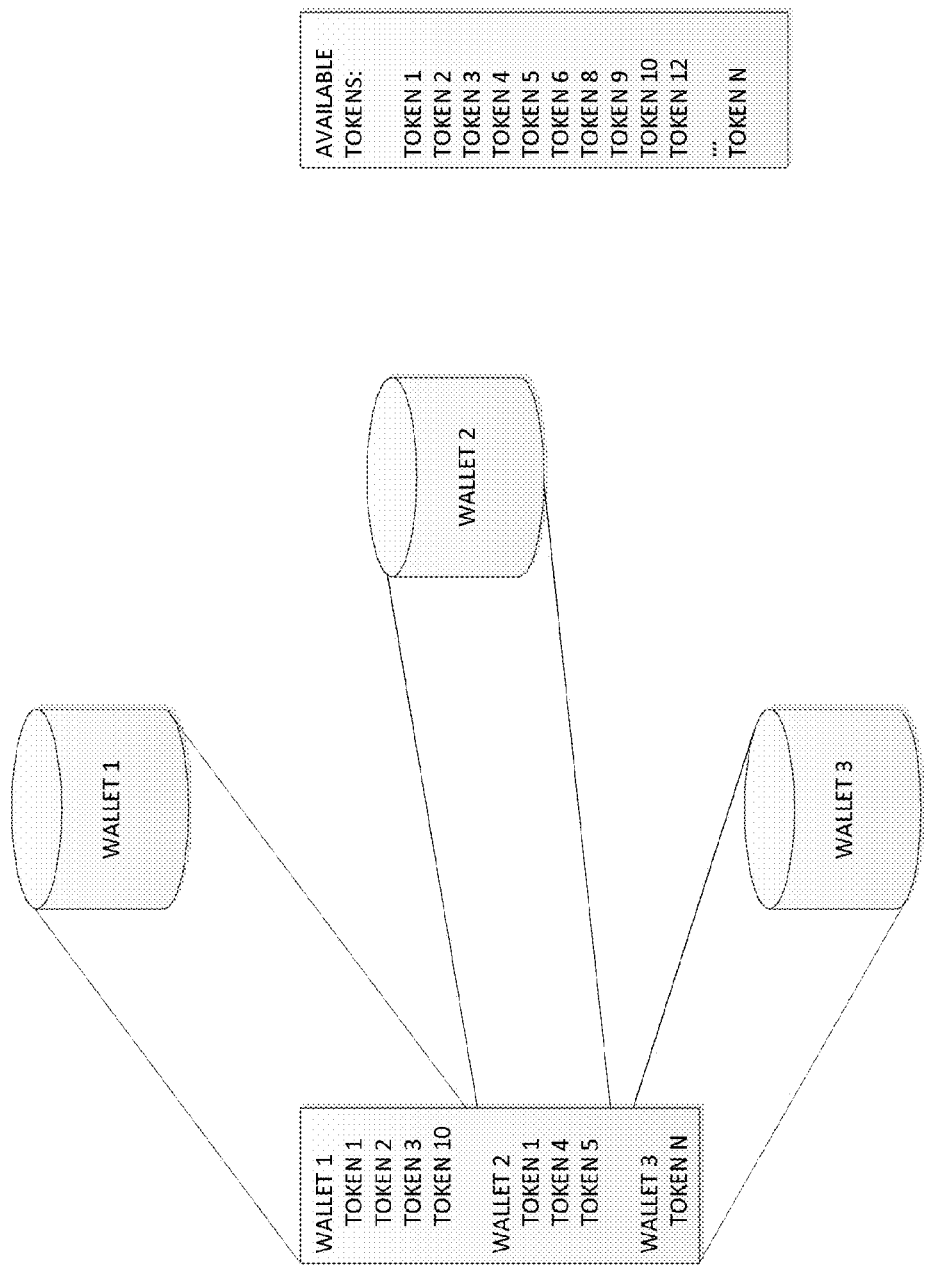
Figure 6:
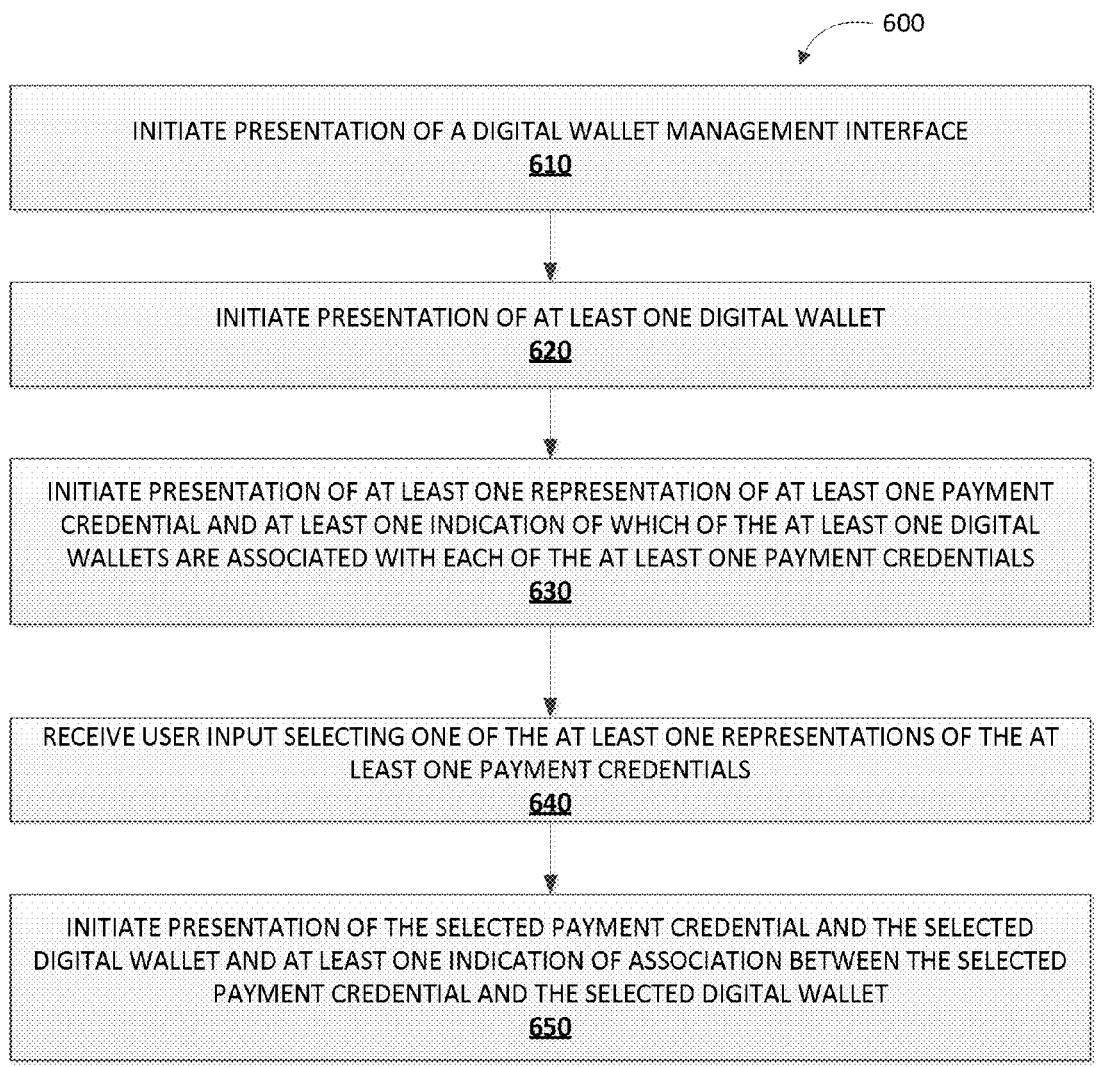
Figure 7:
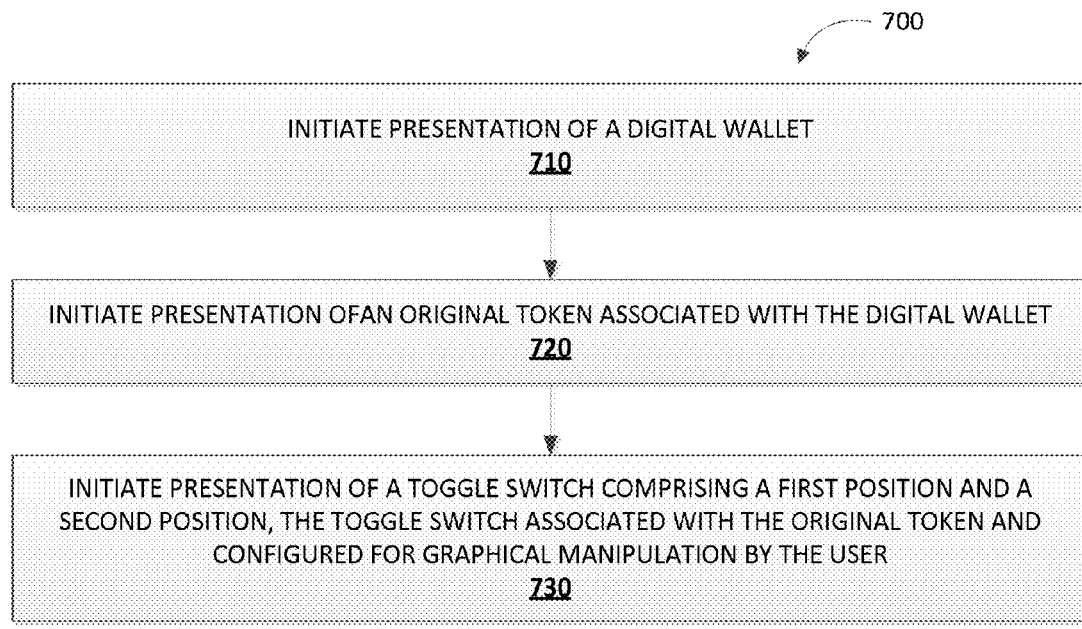
Figure 8:
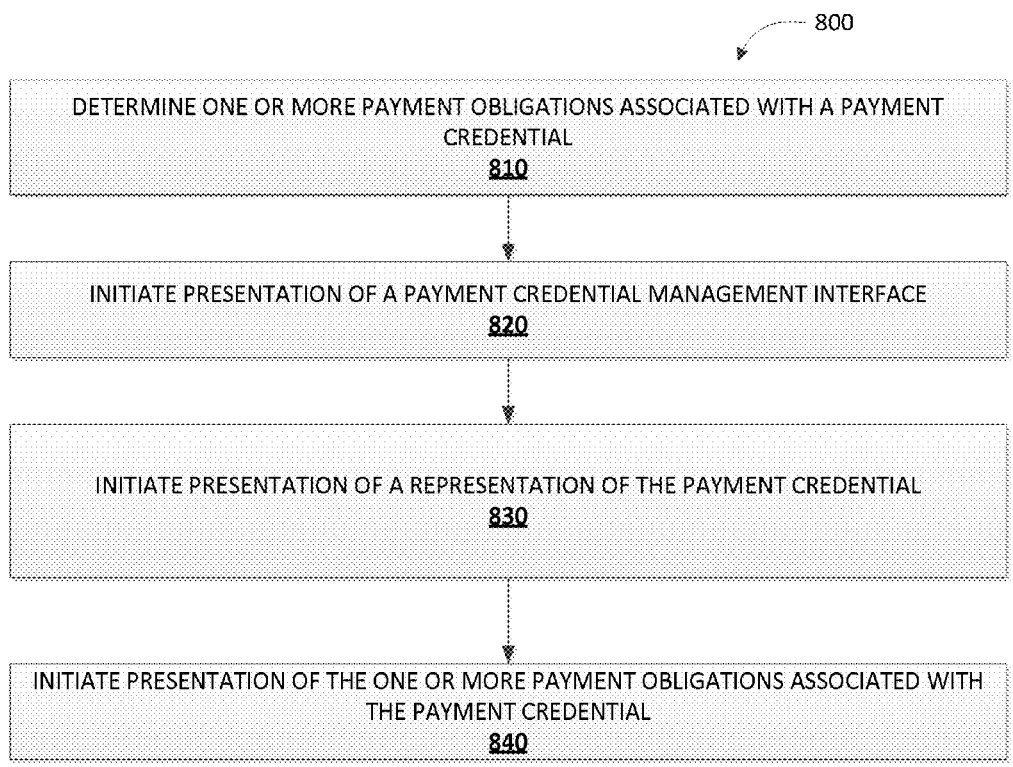

Having thus described embodiments of the invention in general terms, reference will now be made to the accompanying drawings, where:

FIG. 1 is a diagram illustrating a token system, in accordance with embodiments of the present invention;

FIG. 2 is a diagram illustrating a token system, in accordance with embodiments of the present invention;

FIG. 3 is a diagram illustrating a token system, in accordance with embodiments of the present invention;

FIG. 4 is a diagram illustrating an environment in which systems according to embodiments of the invention operate;

FIG. 5 is a representation of an interface for managing digital wallets according to embodiments of the invention;

FIG. 6 is a flowchart illustrating a method for digital wallet management according to embodiments of the invention;

FIG. 7 is a flowchart illustrating a method for digital wallet management according to embodiments of the invention; and FIG. 8 is a flowchart illustrating a method for digital wallet management according to embodiments of the invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

In accordance with embodiments of the invention, the term "financial transaction" or "transaction" refers to any transaction involving directly or indirectly the movement of monetary funds through traditional paper transaction processing systems (i.e. paper check processing) or through electronic transaction processing systems. Typical financial transactions include point of sale (POS) transactions, automated teller machine (ATM) transactions, internet transactions, electronic funds transfers (EFT) between accounts, transactions with a financial institution teller, personal checks, etc. When discussing that transactions are evaluated it could mean that the transaction has already occurred, is in the processing of occurring or being processed, or it has yet to be processed by one or more financial institutions. In some embodiments of the invention the transaction may be a customer account event, such as but not limited to the customer changing a password, ordering new checks, adding new accounts, opening new accounts, etc.

In accordance with embodiments of the invention, the term "financial institution" refers to any organization in the business of moving, investing, or lending money, dealing in financial instruments, or providing financial services. This includes commercial banks, thrifts, federal and state savings banks, savings and loan associations, credit unions, investment companies, merchants, insurance companies and the like.

In accordance with embodiments of the invention the terms "customer" and "user" and "consumer" may be interchangeable. These terms may relate to a direct customer of the financial institution or person or entity that has authorization to act on behalf of the direct customer, user, or consumer (i.e., indirect customer).

Various embodiments of the present invention relate to tokenization, which is generally described in the area of financial transactions as utilizing a "token" (e.g., an alias, substitute, surrogate, or other like identifier) as a replacement for sensitive account information, and in particular account numbers. As such, tokens or portions of tokens may be used as a stand in for a user account number, user name, pin number, routing information related to the financial institution associated with the account, security code, or other like information relating to the user account. The one or more tokens may then be utilized as a payment instrument to complete a transaction. The one or more tokens may be associated with one or more payment devices directly or within one or more digital wallets associated with the payment devices. In other embodiments, the tokens may be associated with electronic transactions that are made over the Internet instead of using a physical payment device. Utilizing a token as a payment instrument instead of actual account information, and specifically an account number, improves security, and provides flexibility and convenience in controlling the transactions, controlling accounts used for the transactions, and sharing transactions between various users.

Tokens may be single-use instruments or multi-use instruments depending on the types of controls (e.g., limits) initiated for the token, and the transactions in which the token is used as a payment instrument. Single-use tokens may be utilized once, and thereafter disappear, are replaced, or are erased, while multi-use tokens may be utilized more than once before they disappear, are replaced, or are erased.

Tokens may be 16-digit numbers (e.g., like credit, debit, or other like account numbers), may be numbers that are less than 16-digits, or may contain a combination of numbers, symbols, letters, or the like, and be more than, less than, or equal to 16-characters. In some embodiments, the tokens may have to be 16-characters or less in order to be compatible with the standard processing systems between merchants, acquiring financial institutions (e.g., merchant financial institution), card association networks (e.g., card processing companies), issuing financial institutions (e.g., user financial institution), or the like, which are used to request authorization, and approve or deny transactions entered into between a merchant (e.g., a specific business or individual user) and a user. In other embodiments of the invention, the tokens may be other types of electronic information (e.g., pictures, codes, or the like) that could be used to enter into a transaction instead of, or in addition to, using a string of characters (e.g., numbered character strings, alphanumeric character strings, symbolic character strings, combinations thereof, or the like).

A user may have one or more digital wallets on the user's payment device. The digital wallets may be associated specifically with the user's financial institution, or in other embodiments may be associated with a specific merchant, group of merchants, or other third parties. The user may associate one or more user accounts (e.g., from the same institution or from multiple institutions) with the one or more digital wallets. In some embodiments, instead of the digital wallet storing the specific account number associated with the user account, the digital wallet may store a token or allow access to a token (e.g., provide a link or information that directs a system to a location of a token), in order to represent the specific account number during a transaction. In other embodiments of the invention, the digital wallet may store some or all of the user account information (e.g., account number, user name, pin number, or the like), including the user account number, but presents the one or more tokens instead of the user account information when entering into a transaction with a merchant. The merchant may be a business, a person that is selling a good or service (hereinafter "product"), or any other institution or individual with which the user is entering into a transaction.

The digital wallet may be utilized in a number of different ways. For example, the digital wallet may be a device digital wallet, a cloud digital wallet, an e-commerce digital wallet, or another type of digital wallet. In the case of a device digital wallet the tokens are actually stored on the payment device. When the device digital wallet is used in a transaction the token stored on the device is used to enter into the transaction with the merchant. With respect to a cloud digital wallet the device does not store the token, but instead the token is stored in the cloud of the provider of the digital wallet (or another third party). When the user enters into a transaction with a merchant, transaction information is collected and provided to the owner of the cloud to determine the token, and thus, how the transaction should be processed. In the case of an e-commerce digital wallet, a transaction is entered into over the Internet and not through a point of sale terminal. As was the case with the cloud digital wallet, when entering into a transaction with the merchant over the Internet the transaction information may be captured and transferred to the wallet provider (e.g., in some embodiments this may be the merchant or another third party that stores the token), and the transaction may be processed accordingly.

Specific tokens, in some embodiments, may be tied to a single user account, but in other embodiments, may be tied to multiple user accounts, as will be described throughout this application. In some embodiments a single tokens could represent multiple accounts, such that when entering into a transaction the user may select the token (or digital wallet associated with the token) and select one of the one or more accounts associated with the token in order to allocate the transaction to a specific account. In still other embodiments, after selection of the token by the user the system may determine the best account associated with the token to use during the transaction (e.g., most cash back, most rewards points, best discount, or the like). In addition, the tokens may be associated with a specific digital wallet or multiple digital wallets as desired by the institutions or users.

Moreover, the tokens themselves, or the user accounts, individual users, digital wallets, or the like associated with the tokens, may have limitations that limit the transactions that the users may enter into using the tokens. The limitations may include, limiting the transactions of the user to a single merchant, a group of multiple merchants, merchant categories, single products, a group a products, product categories, transaction amounts, transaction numbers, geographic locations, or other like limits as is described herein.

FIGS. 1 through 3 illustrate a number of different ways that the user 2 may use one or more tokens in order to enter into a transaction, as well as how the parties associated with the transaction may process the transaction. FIG. 1, illustrates one embodiment of a token system process 1, wherein the token system process 1 is used in association with a tokenization service 50. The tokenization service 50 may be provided by a third-party institution, the user's financial institution, or another institution involved in a transaction payment process. As illustrated in FIG. 1 (as well as in FIGS. 2 and 3), a user 2 may utilize a payment device 4 (or in other embodiments a payment instrument over the Internet) to enter into a transaction. FIG. 1 illustrates the payment device 4 as a mobile device, such as a smartphone, personal digital assistant, or other like mobile payment device. Other types of payment devices 4 may be used to make payments, such as but not limited to an electronic payment card, key fob, a wearable payment device (e.g., watch, glasses, or the like), or other like payment devices 4. As such, when using a payment device 4 the transaction may be made between the point of sale (POS) and the payment device 4 by scanning information from the payment device 4, using near field communication (NFC) between the POS and the payment device 4, using wireless communication between the POS and the payment device 4, or using another other type of communication between the POS and the payment device 4. When entering into an e-commerce transaction over the Internet, for example using the payment device 4 or another device without a POS, a payment instrument (e.g., a payment application that stores the token) may be used to enter into the transaction. The payment instrument may be the same as the token or digital wallet associated with the payment device 4, except they are not associated with specific payment device. For example, the token or digital wallet may be associated with a payment application that can be used regardless the device being used to enter into the transaction over the Internet.

The token can be associated directly with the payment device 4, or otherwise, through one or more digital wallets associated with the payment device 4. For example, the token may be stored on one or more payment devices 4 directly, and as such any transaction entered into by the user 2 with the one or more payment devices 4 may utilize the token. Alternatively, the payment device 4 may have one or more digital wallets stored on the payment device 4 that allow the user 2 to store one or more user account numbers, or tokens associated with the user account numbers, on the one or more digital wallets. The user may select a digital wallet or account within the digital wallet in order to enter into a transaction using a specific type of customer account. As such, the digital wallets may be associated with the user's issuing financial institutions 40, other financial institutions, merchants 10 with which the user enters into transactions, or a third party institutions that facilitates transactions between users 2 and merchants 10.

As illustrated in FIG. 1, a tokenization service 50 may be available for the user 2 to use during transactions. As such, before entering into a transaction, the user 2 may generate (e.g., create, request, or the like) a token in order to make a payment using the tokenization service 50, and in response the tokenization service 50 provides a token to the user and stores an association between the token and the user account number in a secure token and account database 52. The token may be stored in the user's payment device 4 (e.g., on the digital wallet) or stored on the cloud or other service through the tokenization service 50. The tokenization service 50 may also store limits (e.g., geographic limits, transaction amount limits, merchant limits, product limits, any other limit described herein, or the like) associated with the token that may limit the transactions in which the user 2 may enter. The limits may be placed on the token by the user 2, or another entity (e.g., client, administrator, person, company, or the like) responsible for the transactions entered into by the user 2 using the account associated with the token. The generation of the token may occur at the time of the transaction or well in advance of the transaction, as a one-time use token or multi-use token.

After or during creation of the token the user 2 enters into a transaction with a merchant 10 using the payment device 4 (or payment instrument over the Internet). In some embodiments the user 2 may use the payment device 4 by itself, or specifically select a digital wallet or user account stored within the digital wallet, to use in order to enter into the transaction. The token associated with payment device, digital wallet, or user account within the wallet is presented to the merchant 10 as payment in lieu of the actual user account number and/or other user account information. The merchant 10 receives the token, multiple tokens, and/or additional user account information for the transaction. The merchant 10 may or may not know that the token being presented for the transaction is a substitute for a user account number or other user account information. The merchant also captures transaction information (e.g., merchant, merchant location, transaction amount, product, or the like) related to the transaction in which the user 2 is entering with the merchant 10.

The merchant 10 submits the token (as well as any user account information not substituted by a token) and the transaction information for authorization along the normal processing channels (also described as processing rails), which are normally used to process a transaction made by the user 2 using a user account number. In one embodiment of the invention the acquiring financial institution 20, or any other institution used to process transactions from the merchant 10, receives the token, user account information, and transaction information from the merchant 10. The acquiring financial institution 20 identifies the token as being associated with a particular tokenization service 50 through the token itself or user account information associated with the token. For example, the identification of the tokenization service 50 may be made through a sub-set of characters associated with the token, a routing number associated with the token, other information associated with the token (e.g., tokenization service name), or the like. The acquiring financial institution 20 may communicate with the tokenization service 50 in order to determine the user account number associated with the token. The tokenization service 50 may receive the token and transaction data from the acquiring financial institution 20, and in response, provide the acquiring financial institution 20 the user account number associated with the token as well as other user information that may be needed to complete the transaction (e.g., user name, issuing financial institution routing number, user account number security codes, pin number, or the like). In other embodiments, if limits have been placed on the token, the tokenization service 50 may determine whether or not the transaction information meets the limits and either allows or denies the transaction (e.g., provides the user account number or fails to provide the user account number). The embodiment being described occurs when the token is actually stored on the payment device 4. In other embodiments, for example, when the actual token is stored in a cloud the payment device 4 may only store a link to the token or other token information that allows the merchant 10 or acquiring financial institution to acquire the token from a stored cloud location.

If the acquiring financial institution 20 receives the user account number from the tokenization service 50 (e.g., the tokenization service indicates that the transaction meets the limits), then the acquiring financial institution 20 thereafter sends the user account number, the other user information, and the transaction information directly to the issuing financial institution 40, or otherwise indirectly through the card association networks 30. The issuing financial institution 40 determines if the user 2 has the funds available to enter into the transaction, and if the transaction meets other limits on the user account, and responds with approval or denial of the transaction. The approval runs back through the processing channels until the acquiring financial institution 20 provides approval or denial of the transaction to the merchant 10 and the transaction between the merchant 10 and the user 2 is completed. After the transaction is completed the token may be deleted, erased, or the like if it is a single-use token, or stored for further use if it is a multi-use token.

Instead of the process described above, in which the acquiring financial institution 20 requests the token from the tokenization service 50, in some embodiments the tokenization service 50 may receive the transaction request and transaction information from the merchant 10 or acquiring financial institution 20. Instead of providing the account number to the acquiring financial institution 20, the tokenization service 50 may send the transaction request and transaction information to the issuing financial institution 40 directly, or indirectly through the payment association networks 30.

The embodiment illustrated in FIG. 1 prevents the user account number and other user information from being presented to the merchant 10; however, the tokenization service 50, acquiring financial institution 20, the card association networks 30, and the issuing financial institution 40 may all utilize the actual user account number and other user information to complete the transaction.

FIG. 2 illustrates another embodiment of a token system process 1, in which the user 2 may utilize a payment device 4 (or payment instrument over the Internet) to enter into transactions with merchants 10 utilizing tokens instead of user account numbers. As illustrated in FIG. 2, the user may have one or more tokens, which may be associated with the payment device 4, one or more digital wallets within the payment device 4, or one or more user accounts associated with the digital wallets. The one or more tokens may be stored in the user's payment device 4 (or on the digital wallet), or stored on a cloud or other service through the issuing financial institution 40 or another institution. The user 2 may set up the digital wallet by communicating with the issuing financial institution 40 (e.g., the user's financial institution) to request a token for the payment device, either for the device itself, or for one or more digital wallets or one or more user accounts stored on the payment device. As previously discussed, a wallet may be specifically associated with a particular merchant (e.g., received from the merchant 10) and include one or more tokens provided by the issuing financial institution 40 directly (or through the merchant as described with respect to FIG. 3). In other embodiments, the issuing financial institution 40 may create the digital wallet for the user 2 (e.g., through a wallet created for a business client or retail client associated with the user 2) and include one or more tokens for various types of transactions, products, or the like. The issuing financial institution 40 may store the tokens, the associated user account information (e.g., including the user account number), and any limits on the use of the tokens, as was previously described with respect to the tokenization service 50 in FIG. 1. In one embodiment the tokens may include user account information or routing information within the token or tied to the token, which allows the merchants 10 and other institutions in the payment processing systems to route the token and the transaction information to the proper institutions for processing. In other embodiments a tokenization routing database 32 may be utilized to determine where to route a transaction using a token, as described in further detail later.

The user 2 may enter into a transaction with the merchant 10 using a payment device 4 (or a payment instrument through the Internet). In one embodiment the user 2 may enter into the transaction with a token associated with the payment device 4 itself (or a payment instrument through the Internet). In other embodiments, a specific digital wallet and/or a specific account within the digital wallet may be selected for a particular merchant with whom the user 2 wants to enter into a transaction. For example, the user 2 may select "wallet 1" to enter into a transaction with "merchant 1" and "token 1" to utilize a specific account. The merchant 10 identifies the token, and sends the token and the transaction information to the acquiring financial institution 20. If the token has routing information the acquiring financial institution 20 may route the token and transaction data to the issuing financial institution 40 directly or through the card association networks 30. In situations where the token does not have associated routing information, the acquiring financial institution 20 may utilize a tokenization routing database 32 that stores tokens or groups of tokens and indicates to which issuing financial institutions 40 the tokens should be routed. One or more of the acquiring financial institutions 20, the card association networks 30, and/or the issuing financial institutions 40 may control the tokenization routing database in order to assign and manage routing instructions for tokenization across the payment processing industry. The tokenization routing database 32 may be populated with the tokens and the corresponding issuing financial institutions 40 to which transactions associated with the tokens should be routed. However, in some embodiments no customer account information would be stored in this tokenization routing database 32, only the instructions for routing particular tokens may be stored.

Once the token and transaction details are routed to the issuing financial institution 40, the issuing financial institution 20 determines the user account associated with the token through the use of the token account database 42. The financial institution determines if the funds are available in the user account for the transaction and if the transaction information meets other limits by comparing the transaction information with the limits associated with the token, the user account associated with the token, or other limits described herein. If the transaction meets the limits associated with the token or user account, then the issuing financial institution 20 allows the transaction. If the transaction information does not meet one or more of the limits, then the issuing financial institution 20 denies the transaction. The issuing financial institution sends a notification of the approval or denial of the transaction back along the channels of the transaction processing system to the merchant 10, which either allows or denies the transaction.

The embodiment illustrated in FIG. 2 allows the user and the financial institution to shield the user's account number and other user information from all of the entities in the payment processing system because the merchant 10, acquiring merchant bank 20, payment association networks 30, or other institutions in the payment processing system only use the token and/or other shielded user information to process the transaction. Only the issuing financial institution 40 has the actual account number of the user 2.

FIG. 3 illustrates another embodiment of the token system process 1, in which the user 2 may utilize a payment device 4 (or payment instrument over the Internet) to enter into transactions with a merchant 10 utilizing a token instead of a user account number and/or other user account information. As illustrated in FIG. 3, the user 2 may have one or more tokens associated with the payment device 2, the one or more digital wallets, or one or more user accounts within the digital wallets. The one or more tokens may be stored in the user's payment device 4 (or within the digital wallet), or stored on a cloud or other service through the issuing financial institution 40 or another institution. The user 2 may set up the digital wallet by communicating with the issuing financial institution 40 (e.g., the user's financial institution) and/or the merchant 10 to request a token for the payment device 4, either for the payment device 4 itself, for the one or more digital wallets stored on the payment device 4, or for user accounts within the digital wallet. The financial institution 40 may have a dedicated group of tokens that are associated with a specific merchant, and as such the merchant 10 and the issuing financial institution 40 may communicate with each other to provide one or more tokens to the user 2 that may be specifically associated with the merchant 10. For example, the issuing financial institution may provide a set of tokens to "merchant 1" to associate with "wallet 1" that may be used by one or more users 2. As such "Token 10" may be associated with "wallet 1" and be specified only for use for transactions with "merchant 1."

The merchant 10 may provide the specific tokens from the financial institution 40 to the user 2, while the financial institution 40 may store the user account information with the token provided to the user 2. The financial institution may communicate directly with the user 2, or through the merchant 10 in some embodiments, in order to associate the token with the user 2. Since the merchant 10 provides, or is at least notified by the financial institution 40, that a specific token, or groups of tokens, are associated with a specific issuing financial institution 40, then the merchant 10 may associate routing information and transaction information with the token when the user 2 enters into a transaction with the merchant 10 using the token.

The merchant 10 passes the token (and potentially other user account information), routing information, and transaction information to the acquiring financial institution 20 using the traditional payment processing channels. The acquiring financial institution 20, in turn, passes the token (and potentially other user account information) and transaction information to the issuing financial institution 40 directly, or indirectly through the payment association networks 30 using the routing information. The issuing financial institution 40 accesses the token and account database 42 to identify the user account associated with the token and determines if the transaction information violates any limits associated with the token or the user account. The issuing financial institution 40 then either approves or denies the transaction and sends the approval or denial notification back through the payment processing system channels to the merchant 10, which then notifies the user 2 that the transaction is allowed or denied.

As is the case with the token system process 1 in FIG. 2, the token system process 1 in FIG. 3 allows the user 2 and the financial institution 40 to shield the user's account number and other user information from all of the entities in the payment processing system because the merchant 10, acquiring merchant bank 20, payment association networks 30, or other institutions in the payment processing system only use the token and/or other shielded user information to process the transaction. Only the issuing financial institution 40 has the actual account number of the user 2.

The embodiments of the invention illustrated in FIGS. 1 through 3 are only example embodiments of the invention, and as such it should be understood that combinations of these embodiments, or other embodiments not specifically described herein may be utilized in order to process transactions between a user 2 and merchant 10 using one or more tokens as a substitute for user account numbers or other user account information, such that the merchant 10, or other institutions in the payment processing system do not have access to the actual user accounts or account information.

As briefly discussed above, if the issuing financial institution 40 creates the digital wallet not only does the issuing financial institution 40 receive transaction information along the normal processing channels, but the financial institution 50 may also receive additional transaction information from the user 2 through the digital wallet using the application program interfaces (APIs) or other applications created for the digital wallet. For example, geographic location information of the user 2, dates and times, product information, merchant information, or any other information may be transmitted to the issuing financial institution 40 through the APIs or other applications to the extent that this information is not already provided through the normal transaction processing channels. This additional transaction information may assist in determining if the transactions meet or violate limits associated with the tokens, user accounts, digital wallets, or the like.

Alternatively, if the merchant 10 or another institution, other than the issuing financial institution 40, provides the digital wallet to the user 2, the issuing financial institution 40 may not receive all the transaction information from the traditional transaction processing channels or from the digital wallet. As such, the issuing financial institution 40 may have to receive additional transaction information from another application associated with the user 2 and compare the transaction information received through the traditional channels in order to associate the additional information with the transaction. In other embodiments, the issuing financial institutions 40 may have partnerships with the merchants 10 or other institutions to receive additional transaction information from the digital wallets provided by the merchants or other institutions when the users 2 enter into transactions using the digital wallets.

Moreover, when there is communication between the digital wallets of the users 2 and the issuing financial institution 40 or another institution, transactions in which the user 2 may enter may be pre-authorized (e.g., pre-qualified) to determine what accounts (e.g., tokens) may be used to complete the transaction, without having to arbitrarily choose an account for the transaction. In the case when there are multiple digital wallets or multiple accounts, the account that is pre-authorized or the account that provides the best rewards may be automatically chosen to complete the transactions.

Additional embodiments of the invention will now be described in further detail in order to provide additional concepts and examples related to how tokens may be utilized in these illustrated token system processes 1 or in other token system processes not specifically described in FIGS. 1 through 3.

Referring to FIG. 4, a network environment is illustrated in accordance with embodiments of the present invention. As illustrated in FIG. 4, the remote server 402 is operatively coupled via a network 401 to the mobile device 404 and/or a point of transaction (POT) 406. In this configuration, the remote server 402 may send information to and receive information from the mobile device 404 and/or the POT 406. Additionally, the mobile device 404 may send and receive communications directly from the POT 406. The remote server 402 may be or include one or more network base stations or other network components. FIG. 4 illustrates only one example of an embodiment of a network environment 400, and it will be appreciated that in other embodiments one or more of the systems, devices, or servers may be combined into a single system, device, or server, or be made up of multiple systems, devices, or server.

The network 401 may be a global area network (GAN), such as the Internet, a wide area network (WAN), a local area network (LAN), a telecommunication network or any other type of network or combination of networks. The network 401 may provide for wireline, wireless, or a combination wireline and wireless communication between devices on the network 401.

In some embodiments, the user 405 is an individual who maintains cellular products with one or more providers.

As illustrated in FIG. 4, the remote server 402 generally comprises a communication device 450, a processing device 452, and a memory device 454. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combination of the foregoing. Control and signal processing functions of the system are allocated between these processing devices according to their respective capabilities. The processing device may include functionality to operate one or more software programs based on computer readable instructions thereof, which may be stored in a memory device.

The processing device 452 is operatively coupled to the communication device 450 to communicate with the network 401 and other devices on the network 401. As such, the communication device 450 generally comprises a modem, server, or other device for communicating with other devices on the network 401.

As further illustrated in FIG. 4, the network remote server 402 comprises computer readable instructions 458 of an application 460. In some embodiments, the memory device, 454 includes data storage 456 for storing data related to and/or used by the application 460. The application 460 may perform one or more of the steps and/or sub-steps discussed herein and/or one or more steps not discussed herein. For example, in some embodiments, the application 460 may initiate presentation of an interface for digital wallet management.

As illustrated in FIG. 4, the mobile device 404 generally comprises a communication device 430, a processing device 432, and a memory device 434. The processing device 432 is operatively coupled to the communication device 430 and the memory device 434. In some embodiments, the processing device 432 may send or receive data from the mobile device 404, to the remote server 402 via the communication device 430 over a network 401. As such, the communication device 430 generally comprises a modem, server, or other device for communicating with other devices on the network 401.

As further illustrated in FIG. 4, the mobile device 404 comprises computer readable instructions 438 stored in the memory device 434, which in one embodiments includes the computer-readable instructions 438 of an application 440. In the embodiment illustrated in FIG. 4, the application 440 allows the mobile device 404 to be linked to the remote server 402 to communicate, via a network 401. The application 440 may also allow the mobile device to connect directly (i.e. locally or device to device) with the POT 406 for performing a transaction. The application 440 may perform one or more of the steps and/or sub-steps discussed herein and/or one or more steps not discussed herein. For example, in some embodiments, the application 440 may initiate presentation of an interface for digital wallet management.

As illustrated in FIG. 4, the POT 406 may include a communication device 410, a processing device 412, and a memory device 414. The processing device 412 is operatively coupled to the communication device 410 and the memory device 414. In some embodiments, the processing device 412 may send or receive data from the mobile device 404 and/or the remote server 402 via the communication device 410. Such communication may be performed either over a direct connection and/or over a network 401. As such, the communication device 410 generally comprises a modem, server, or other device for communication with other devices on the network 401.

As further illustrated in FIG. 4, the POT 406, comprises computer-readable instructions 418 of an application 420. In the embodiment illustrated in FIG. 4, the application 420 allows the ATM 406 to be linked to the remote server 402 to communicate, via a network 401. The application 420 may also allow the mobile device 406 to connect directly (i.e., locally or device to device) with the POT 406 or indirectly through the network 401. The application 420 may perform one or more of the steps and/or sub-steps discussed herein and/or one or more steps not discussed herein.

It is understood that the servers, systems, and devices described herein illustrate one embodiment of the invention. It is further understood that one of more of the server, systems, and devices can be combined in other embodiments and still function in the same or similar way as the embodiments described herein.

In various embodiments, the POT device may be or include a merchant machine and/or server and/or may be or include the mobile device of the user may function as a point of transaction device. The embodiments described herein may refer to the use of a transaction, transaction event or point of transaction event to trigger the steps, functions, routines etc. described herein. In various embodiments, occurrence of a transaction triggers the sending of information such as alerts and the like. Unless specifically limited by the context, a "transaction", "transaction event" or "point of transaction event" refers to any communication between the user and the merchant, e.g. financial institution, or other entity monitoring the user's activities. In some embodiments, for example, a transaction may refer to a purchase of goods or services, a return of goods or services, a payment transaction, a credit transaction, or other interaction involving a user's bank account. As used herein, a "bank account" refers to a credit account, a debit/deposit account, or the like. Although the phrase "bank account" includes the term "bank," the account need not be maintained by a bank and may, instead, be maintained by other financial institutions. For example, in the context of a financial institution, a transaction may refer to one or more of a sale of goods and/or services, an account balance inquiry, a rewards transfer, an account money transfer, opening a bank application on a user's computer or mobile device, a user accessing their e-wallet or any other interaction involving the user and/or the user's device that is detectable by the financial institution. As further examples, a transaction may occur when an entity associated with the user is alerted via the transaction of the user's location. A transaction may occur when a user accesses a building, uses a rewards card, and/or performs an account balance query. A transaction may occur as a user's mobile device establishes a wireless connection, such as a Wi-Fi connection, with a point-of-sale terminal. In some embodiments, a transaction may include one or more of the following: purchasing, renting, selling, and/or leasing goods and/or services (e.g., groceries, stamps, tickets, DVDs, vending machine items, etc.); withdrawing cash; making payments to creditors (e.g., paying monthly bills; paying federal, state, and/or local taxes and/or bills; etc.); sending remittances; transferring balances from one account to another account; loading money onto stored value cards (SVCs) and/or prepaid cards; donating to charities; and/or the like.

In some embodiments, the transaction may refer to an event and/or action or group of actions facilitated or performed by a user's device, such as a user's mobile device. Such a device may be referred to herein as a "point-of-transaction device". A "point-of-transaction" could refer to any location, virtual location or otherwise proximate occurrence of a transaction. A "point-of-transaction device" may refer to any device used to perform a transaction, either from the user's perspective, the merchant's perspective or both. In some embodiments, the point-of-transaction device refers only to a user's device, in other embodiments it refers only to a merchant device, and in yet other embodiments, it refers to both a user device and a merchant device interacting to perform a transaction. For example, in one embodiment, the point-of-transaction device refers to the user's mobile device configured to communicate with a merchant's point of sale terminal, whereas in other embodiments, the point-of-transaction device refers to the merchant's point of sale terminal configured to communicate with a user's mobile device, and in yet other embodiments, the point-of-transaction device refers to both the user's mobile device and the merchant's point of sale terminal configured to communicate with each other to carry out a transaction.

As used herein, a "user device" or "mobile device" may be a point-of-transaction device as discussed, or may otherwise be a device carried by a user configured to communicate across a network such as a cellular network, wireless fidelity network or otherwise. As used here a "user" refers to a previous customer or a non-customer of one or more merchants or entities associated with one or more merchants.

In some embodiments, a point-of-transaction device is or includes an interactive computer terminal that is configured to initiate, perform, complete, and/or facilitate one or more transactions. A point-of-transaction device could be or include any device that a user may use to perform a transaction with an entity, such as, but not limited to, an ATM, a loyalty device such as a rewards card, loyalty card or other loyalty device, a magnetic-based payment device (e.g., a credit card, debit card, etc.), a personal identification number (PIN) payment device, a contactless payment device (e.g., a key fob), a radio frequency identification device (RFID) and the like, a computer, (e.g., a personal computer, tablet computer, desktop computer, server, laptop, etc.), a mobile device (e.g., a smartphone, cellular phone, personal digital assistant (PDA) device, MP3 device, personal GPS device, etc.), a merchant terminal, a self-service machine (e.g., vending machine, self-checkout machine, etc.), a public and/or business kiosk (e.g., an Internet kiosk, ticketing kiosk, bill pay kiosk, etc.), a gaming device, and/or various combinations of the foregoing.

In some embodiments, a point-of-transaction device is operated in a public place (e.g., on a street corner, at the doorstep of a private residence, in an open market, at a public rest stop, etc.). In other embodiments, the point-of-transaction device is additionally or alternatively operated in a place of business (e.g., in a retail store, post office, banking center, grocery store, factory floor, etc.). In accordance with some embodiments, the point-of-transaction device is not owned by the user of the point-of-transaction device. Rather, in some embodiments, the point-of-transaction device is owned by a mobile business operator or a point-of-transaction operator (e.g., merchant, vendor, salesperson, etc.). In yet other embodiments, the point-of-transaction device is owned by the financial institution offering the point-of-transaction device providing functionality in accordance with embodiments of the invention described herein.

Referring now to FIG. 5, a diagram illustrates an example of an interface for managing digital wallets. The example interface illustrates a combined representation of three digital wallets associated with the mobile device of a user. As shown, each of the digital wallets has at least one associated payment credential (e.g., tokens). The tokens, as shown, are sorted into different digital wallets. As shown, each of the digital wallets is also illustrated graphically as a separate entity. Also shown is a comprehensive listing of the tokens available for usage, and therefore, available for association and/or authentication into one or more digital wallets. The customer may select a token from the available token listing and then associate it with a particular wallet by dragging it into the graphical representation of the wallet. In other embodiments, once a token and/or wallet has been selected additional functionality is available, such as that described below with reference to FIGS. 7 and/or 8.

According to embodiments of the invention, during an online banking session, a customer may use an interface to select which payment credentials (cards (credit/debit), tokens etc.) are entered into which digital wallets (e.g., google, paypal etc.). In some instances, the customer is given an opportunity to set limits for each wallet, and in some cases, the customer is provided an opportunity to set timeframe limits. The customer may use an interface for visibility into everywhere a payment credential (e.g., credit/debit card) is tied for payment, recurring or otherwise. In a digital wallet, the customer may provide recurring payment information, and "push-button billpay enrollment".

Referring now to FIG. 6, a flowchart illustrates a method 600 for digital wallet management according to embodiments of the invention.

The first step, represented by block 610, is to initiate presentation of a digital wallet management interface. This interface, in some embodiments, is presented on a mobile device of a customer of a financial institution. The next step, represented by block 620, is to initiate presentation of at least one digital wallet. The digital wallet(s) may be presented in a variety of formats, such as a scrolling format, multiple icons, or a flip-book format where the user may turn pages or leafs associated with each digital as if turning the pages of a book. Next, represented by block 630, the system initiates presentation of at least one representation of at least one payment credential and at least one indication of which of the at least one digital wallets are associated with each of the at least one payment credentials. Each digital wallet may be displayed concurrently, or in some embodiments, may include presentation of only a portion of the available digital wallets, for example, only one or two digital wallets of many available digital wallets. In some embodiments, the payment credentials associated with a digital wallet may be overlaid on the associated digital wallet thereby indicated the payment credential is associated with the digital wallet. In some cases, a payment credential may be associated with more than one digital wallet. In such a case, the payment credential may have an associated icon or representation shown with each of its associated digital wallets. In some embodiments, on the other hand, the interface is payment credential-centric, or in other words, each payment credential is shown separately and the digital wallet(s) to which the payment credential is associated are shown as objects within or otherwise associated with the payment credential. For example, a credit card icon may be shown as a window that includes multiple objects representing the various digital wallets with which the credit card is associated for use.

As used herein, when a payment credential is "associated with" a digital wallet, the payment credential is typically shown by the interface to be connected with the digital wallet for use as a payment credential with the digital wallet. In such a case, the payment credential has been "authenticated for use" in association with the digital wallet such that the user may select the digital wallet for performing a transaction using the associated payment credential. Authentication may require one or more authentication steps with the financial institution that issued the payment credential. As discussed in further detail below, a payment credential may be authenticated for use with a digital wallet but may be de-selected for use with the digital wallet by the user (i.e., it may not be associated with the digital wallet), in which case, the user would not be allowed by the system to use the payment credential in a transaction with the digital wallet regardless of the fact that it has been authenticated for use with the digital wallet. In such a case, the user can use the interface to associate the already authenticated payment credential with the digital wallet and then perform the desired transaction.

In some embodiments, as represented by block 640, user input is received selecting one of the at least one representations of the at least one payment credentials. Next, as represented by block 650, the system initiates presentation of the selected payment credential and the selected digital wallet and at least one indication of association between the selected payment credential and the selected digital wallet. In some embodiments, as discussed above, the interface may be payment credential-centric or digital wallet-centric in that either the payment credential(s) or the digital wallet(s) serve as the "bins" in which the digital wallet(s) and payment credential(s), respectively, may be manipulated. Accordingly, the user may, in some embodiments, click and drag desired icons into the desired bins in order to associate the payment credentials and digital wallets. This may trigger one or more necessary steps, such as authentication of the selected payment credential with the financial institution that issued the payment credential and/or authentication or other verification with the entity that maintains/issues/facilitates the digital wallet.

In some embodiments, one or more of the payment credentials may be "authenticated" for use with a digital wallet but may not be selected for use with the digital wallet. In such cases, the authenticated payment credentials may not be shown as associated with the digital wallet, but rather may reside in a queue bin or other bin. Some separate indicator may be used to indicate that the payment credential is authenticated for use in a digital wallet for which it is not currently associated (i.e., the digital wallet bin does not show that the payment credential is associated). In such a case, when the user selects the payment credential for association with the digital wallet, then less than full authentication or no additional authentication may be required for the payment credential to be associated with the digital wallet due to the previous authentication of the payment credential with the digital wallet.

In various embodiments, the at least one representation of the at least one payment credential includes a graphical object representing the at least one payment credential. Furthermore, in some embodiments, the at least one representation of the at least one digital wallet comprises a graphical object representing the at least one digital wallet. Similarly, in some embodiments, the at least one indication comprises a graphical link between the graphical object representing the at least one payment credential and the graphical object representing the at least one digital wallet. The graphical link, in some embodiments, may include an overlap of the graphical object representing the at least one payment credential with the graphical object representing the at least one digital wallet. In various other embodiments, the graphical link may be one or more other graphical representations of a connection or association between the payment credential and the digital wallet (e.g., one or more graphical similarities of the respective representations).

In various embodiment, the system is configured to receive user input setting a usage limit for one of the at least one digital wallets. This usage limit may be a threshold spending limit. Such a threshold spending limit may reference an aggregation of all the payment credentials associated with the digital wallet. In some instances, the usage limit is a threshold spending limit to be applied to each of the payment credentials associated with the digital wallet individually. In other cases, the usage limit is a threshold number of transactions for an aggregation of all the payment credentials associated with the digital wallet. In various embodiments, the usage limit is or includes a threshold number of transactions applied to each of the payment credentials associated with the digital wallet individually.

In various embodiments, the usage limit is a timing limit to be applied to an aggregation of all the payment credentials associated with the digital wallet. In other embodiments, the usage limit is a timing limit to be applied to each of the payment credentials associated with the digital wallet.

In some embodiments, the digital wallet management interface is accessed by a customer authenticated through an online banking session administered by a financial institution also administering the digital wallet. In some embodiments, the interface is accessed by a customer authenticated through a mobile banking application session administered by a financial institution also administering the digital wallet.

According to embodiments of the invention, a customer can operate "toggles" or switches that turn on/off token functionality for various situations. For example, the customer may turn on the "travel toggle", which indicates that the customer is traveling. A token may be changed and then, when the "toggle" is removed, the token may be changed again.

Referring now to FIG. 7, a flowchart illustrates a method 700 for token management according to embodiments of the invention. The method 700 includes, as represented by block 710, initiating presentation of a digital wallet. The next step, represented by block 720, is to initiate presentation of an original token associated with the digital wallet. Finally, as represented by block 730, the system initiates presentation of a toggle switch comprising a first position and a second position.

The toggle switch is associated with the original token and is configured for graphical manipulation by the user. The toggle switch may have a first and a second position in some embodiments, where the first position corresponds to the original token being available for use as a payment credential, and the second position corresponds to the original token being unavailable for use as a payment credential.

In various embodiments, a travel indicator may be configured such that the first position corresponds to the user not traveling and the second position corresponds to the user traveling. In some cases, when the travel indicator is moved from the first position to the second position, the original token is deactivated and a new token is issued to the digital wallet.

In some embodiments, when the travel indicator is moved from the second position to the first position, the new token is deactivated and the original token is re-activated. In some cases, when the travel indicator is moved from the second position to the first position, the new token is deactivated and the second new token is issued to the digital wallet. In some embodiments, the system destroys the original token and/or the new token.

In some embodiments, there may be multiple toggle switches associated with a single payment credential. In some cases, each of the toggle switches may be locked or immovable by the customer based on whether the financial institution or other administering entity allows the toggles to be moved in a particular situation. For example, in some cases, a toggle switch may be associated with traveling, and if it is determined the customer is not traveling (based on, e.g., GPS data), then the toggle switch may be disengaged or immovable by the customer. In some embodiments, the system may propose a particular toggle switch position to the customer via the interface. For example, when it is determined that the customer is traveling (e.g., by using GPS data), then the interface may propose that a travel toggle switch should be activated. Once the user confirms that the user is traveling, then the system activates the travel toggle switch, or in some cases, the user then activates the travel toggle switch manually.

According to embodiments of the invention, a payment credential-centric interface provides the customer visibility into every payment obligation (one time, recurring or otherwise) associated with a payment credential by providing information and management opportunities. The interface may also provide recurring payment information, and "push-button billpay enrollment".

Referring now to FIG. 8, a flowchart illustrates a method 800 for credential management according to embodiments of the invention. The first step, as represented by block 810 is to determine one or more payment obligations associated with a payment credential. The next step, represented by block 820, is to initiate presentation of a payment credential management interface. Next, as represented by block 830, the system initiates presentation of a representation of the payment credential. Finally, as represented by block 840, the system initiates presentation of the one or more payment obligations associated with the payment credential.

In some embodiments, determining the one or more payment obligations associated with the payment credential includes accessing one or more databases to determine whether the payment credential is obligated for a payment having associated information stored in the one or more databases. The payment obligations may be associated with multiple financial institutions and/or payees. Accordingly, the system may require access to multiple, disparate databases to determine whether a particular payment credential has payment obligations. In some instances, the system may determine payment obligations based on determining whether a transaction recurs on a regular basis (e.g., month to month or week to week, etc.).

In some embodiments, determining the one or more payment obligations associated with the payment credential includes determining that the payment credential has been used for one or more recurring transactions for two or more payment periods. In some such embodiments, determining that the payment credential has been used for one or more recurring transactions for two or more payment periods includes determining that the payment credential has been used for two or more consecutive payment periods for a similar transaction comprising a similar transaction amount. In some of these embodiments, determining that the payment credential has been used for one or more recurring transactions for two or more payment periods includes determining that the payment credential has been used for the same transaction amount for two or more consecutive payment periods.

In some embodiments, determining that the payment credential has been used for one or more recurring transactions for two or more payment periods includes determining that the payment credential has been used for a transaction amount within a predetermined percentage threshold of a similar previous payment period. In some embodiments, determining that the payment credential has been used for one or more recurring transactions for two or more payment periods determining that the payment credential has been used for a transaction amount within a predetermined percentage threshold of a corresponding payment period from one year prior.

It will further be understood that a system as contemplated herein can be configured to perform any of the portions of the process flows 600, 700 and/or 800 upon or after one or more triggering events (which, in some embodiments, is one or more any of the portions of the process flows 600, 700 and/or 800). As used herein, "triggering event" refers to an event that automatically triggers the execution, performance, and/or implementation of a triggered action, either immediately, nearly immediately, or sometime after (e.g., within minutes, etc.) the occurrence of the triggering event. For example, in some embodiments, the system performing any of the portions of the process flows 600, 700 and/or 800 is configured such that the system receiving an indication of a compromised payment vehicle or a potential exposure to loss (the triggering event) automatically and immediately or nearly immediately triggers the system to automatically (without human intervention) generate a token for facilitating or completing a pending purchase transaction (the triggered action).

Also it will be understood that, in some embodiments, a predetermined time and/or the passage of a predetermined per any of the portions of the process flows 600, 700 and/or 800. Of course, any of the embodiments described and/or contemplated herein can involve one or more triggering events, triggered actions, automatic actions, and/or human actions.

In addition, it will be understood that, in some embodiments, a system performing any of the portions of the process flows 600, 700 and/or 800 (and/or a user thereof) is configured to perform each portion of the process flows 600, 700 and/or 800 from start to finish, within moments, seconds, and/or minutes (e.g., within approximately 10-15 minutes, etc.). In some embodiments, any of the portions of the process flows 600, 700 and/or 800 are performed in real time, in substantially real time, and/or at one or more predetermined times. Further, it will be understood that the number, order, and/or content of any of the portions of the process flows 600, 700 and/or 800 are exemplary and may vary. It will further be understood that the any of the portions of the process flows 600, 700 and/or 800 can be configured to perform any one or more of the portions of any one or more of the embodiments described and/or contemplated herein.

In various embodiments of the invention, transaction limits and/or thresholds may be used. For example, transaction limits may be used to determine whether a payment credential has been exposed and/or whether to approve or deny a transaction. If a transaction (e.g., transaction information) fails to meet a limit, the transaction may be denied. Alternatively, if a transaction (e.g., transaction information) meets a limit, then the transaction may be allowed.

While the system has been described as determining whether the transaction meets the limits and thereby determining whether an exposure has occurred, in some embodiments filters for determining exposure may also be responsive to transaction information. For example, exceptions to filters may allow a transaction even if a filter is not met. In an embodiment, the system evaluates the transaction information to determine: (1) does the transaction meet the limits; and (2) if the transaction does not meet the limits, does the transaction qualify for an exception to the limits. If the system determines that a positive response to either query, then transaction may be allowed.

In some embodiments, the exceptions are based at least in part upon the transaction information. For example, the system may determine that a transaction does not meet a category limit because doing so would cause the token to exceed the category limit for the time period. In this example, however, the system also determines that the token is near, e.g., within one week, within three days, within one day, or the like, the expiration date of the token or the current evaluation period for the token and that the token has remaining funds in a different category. Given the short period of time remaining for the expenses to be made, the system may determine that the transaction falls within an exception and allow the transaction. In another example, the system may determine that the user is outside of geographic limits defined by a route. The system, however, determines that the user has conducted a transaction at the merchant frequently in the past and therefore allows the transaction based on the previous number of transactions at the merchant. These examples use multiple types of transaction information, e.g., the date of the transaction, the location of the transaction, the category of the transaction, the amount of the transaction, and the like, to determine if the exceptions apply. In some embodiments, only a single piece of transaction information applies. For example, the system may always permit transactions that are associated with a specific category, for example, emergency expenses. The system may always permit transactions at emergency rooms, doctors' offices, and the like.

In some embodiments, the exceptions are determined by the system and/or the user. For example, the system may provide a list of exceptions based on the user's transaction history. If the user has a favorite coffee shop, the system may allow transactions at the coffee shop up to a certain amount even if the transaction would not meet a limit. The user or an administrator may provide exceptions based on location or other transaction information. For example, the user may input exceptions that allow transactions within a specific region, e.g., a city, that would not be allowed outside of the specific region. The exceptions may be changed at any time by the system or user.

The exceptions may be limited by frequency, amount, percentage of the limit, or the like. For example, a transaction may qualify for an exception but only up to a certain percentage of the funds remaining in a related category. For example, a transaction may qualify for an exception because the expense period for the token is almost expired and there are remaining funds in a first category. The system may permit a transaction in a second category up to some percentage (e.g., 50%) of the funds remaining in the first category.

The transaction-responsive limits are designed to provide flexibility to the system and better serve the user. The transaction-responsive limits may be tailored to the user or generic to the token and/or system. By providing for transaction-responsive limits, the system allows transactions that would otherwise be denied based on binary yes/no limits when the transaction information indicates the appropriateness of the transaction.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

To supplement the present disclosure, this application further incorporates entirely by reference the following commonly assigned patent applications:

| U.S. patent application Ser. No. | Title | Filed On |
| --- | --- | --- |
| 14/196,816 | MANAGED DIGITAL WALLETS | Concurrently Herewith |
| 14/196,798 | TOKEN COLLABORATION NETWORK | Concurrently Herewith |
| 14/196,802 | FORMATION AND FUNDING OF A SHARED TOKEN | Concurrently Herewith |
| 14/196,364 | LIMITING TOKEN COLLABORATION NETWORK USAGE BY USER | Concurrently Herewith |
| 14/196,373 | LIMITING TOKEN COLLABORATION NETWORK USAGE BY TOKEN | Concurrently Herewith |
| 14/196,809 | LIMITING THE USE OF A TOKEN BASED ON A USER LOCATION | Concurrently Herewith |
| 14/196,813 | AUTHORIZING A TEMPORARY TOKEN FOR A USER | Concurrently Herewith |

-continued

| U.S. patent application Ser. No. | Title | Filed On |
|---|---|---|
| 14/196,030 | CONTROLLING TOKEN ISSUANCE BASED ON EXPOSURE | Concurrently Herewith |
| 14/196,292 | FLEXIBLE FUNDING ACCOUNT TOKEN ASSOCIATIONS | Concurrently Herewith |
| 14/196,350 | ACCOUNT TOKEN ASSOCIATIONS BASED ON SPENDING THRESHOLDS | Concurrently Herewith |
| 14/196,653 | CUSTOMER TOKEN PREFERENCES INTERFACE | Concurrently Herewith |
| 14/196,752 | CREDENTIAL PAYMENT OBLIGATION VISIBILITY | Concurrently Herewith |
| 14/196,919 | PROVIDING SUPPLEMENTAL ACCOUNT INFORMATION IN DIGITAL WALLETS | Concurrently Herewith |
| 14/196,894 | PROVIDING OFFERS ASSOCIATED WITH PAYMENT CREDENTIALS IN DIGITAL WALLETS | Concurrently Herewith |
| 14/196,869 | PROVIDING OFFERS ASSOCIATED WITH PAYMENT CREDENTIALS AUTHENTICATED IN A SPECIFIC DIGITAL WALLET | Concurrently Herewith |
| 14/196,257 | FOREIGN EXCHANGE TOKEN | Concurrently Herewith |
| 14/196,274 | FOREIGN CROSS-ISSUED TOKEN | Concurrently Herewith |
| 14/196,545 | DIGITAL WALLET EXPOSURE REDUCTION | Concurrently Herewith |
| 14/196,460 | MOBILE DEVICE CREDENTIAL EXPOSURE REDUCTION | Concurrently Herewith |
| 14/196,947 | ATM TOKEN CASH WITHDRAWAL | Concurrently Herewith |
| 14/196,034 | RESTORING OR REISSUING OF A TOKEN BASED ON USER AUTHENTICATION | Concurrently Herewith |
| 14/196,405 | TOKEN USAGE SCALING BASED ON DETERMINED LEVEL OF EXPOSURE | Concurrently Herewith |

What is claimed is:

1. An apparatus for exposure reduction by token deactivation and new token issuance, whereby the apparatus provides a user a comprehensive management platform for managing multiple digital wallets and their associated payment credentials, the apparatus comprising:
a memory;
a processor; and
a module stored in the memory, executable by the processor, and configured to:
initiate presentation of a digital wallet management interface, comprising:
initiating presentation of at least one digital wallet;
initiating presentation of at least one representation of at least one payment credential and at least one indication of which of the at least one digital wallets are associated with each of the at least one payment credentials; and
initiating presentation of a travel toggle switch configured for graphical manipulation by the user between at least a first position and a second position, wherein the first position corresponds to the user not traveling and the second position corresponds to the user traveling;
in response to the travel toggle switch moving from the first position to the second position, deactivating an original payment token; and
issuing a new payment token to the at least one digital wallet.

2. The apparatus of claim 1,
wherein the at least one representation of the at least one payment credential comprises a graphical object representing the at least one payment credential;
wherein the at least one representation of the at least one digital wallet comprises a graphical object representing the at least one digital wallet;
wherein the at least one indication comprises a graphical link between the graphical object representing the at least one payment credential and the graphical object representing the at least one digital wallet.

3. The apparatus of claim 2,
wherein the graphical link comprises an overlap of the graphical object representing the at least one payment credential with the graphical object representing the at least one digital wallet.

4. The apparatus of claim 1, wherein the module is further configured to:
receive user input selecting one of the at least one representations of the at least one payment credentials; and
receive user input selecting one of the at least one digital wallets for association with the selected at least one payment credential.

5. The apparatus of claim 4, wherein the module is further configured to:
initiate presentation of the selected payment credential and the selected digital wallet and at least one indication of association between the selected payment credential and the selected digital wallet.

6. The apparatus of claim 1, wherein the module is further configured to:
receive user input setting a usage limit for one of the at least one digital wallets.

7. The apparatus of claim 6, wherein the usage limit is a threshold spending limit for an aggregation of all the payment credentials associated with the digital wallet.

8. The apparatus of claim 6, wherein the usage limit is a threshold spending limit to be applied to each of the payment credentials associated with the digital wallet individually.

9. The apparatus of claim 6, wherein the usage limit is a threshold number of transactions for an aggregation of all the payment credentials associated with the digital wallet.

10. The apparatus of claim 6, wherein the usage limit is a threshold number of transactions applied to each of the payment credentials associated with the digital wallet individually.

11. The apparatus of claim 6, wherein the usage limit is a timing limit to be applied to an aggregation of all the payment credentials associated with the digital wallet.

12. The apparatus of claim 6, wherein the usage limit is a timing limit to be applied to each of the payment credentials associated with the digital wallet.

13. The apparatus of claim 1, wherein the interface is accessed by a customer authenticated through an online banking session administered by a financial institution also administering the digital wallet.

14. The apparatus of claim 1, wherein the interface is accessed by a customer authenticated through a mobile banking application session administered by a financial institution also administering the digital wallet.

15. A method for exposure reduction by token deactivation and new token issuance, whereby a processor provides a user a comprehensive management platform for managing multiple digital wallets and their associated payment credentials, the method comprising:
- initiate presentation, by a processor, of a digital wallet management interface, comprising:
  - initiating presentation of at least one digital wallet;
  - initiating presentation of at least one representation of at least one payment credential and at least one indication of which of the at least one digital wallets are associated with each of the at least one payment credentials; and
  - initiating presentation of a travel toggle switch configured for graphical manipulation by the user between at least a first position and a second position, wherein the first position corresponds to the user not traveling and the second position corresponds to the user traveling;
- in response to the travel toggle switch moving from the first position to the second position, deactivating an original payment token; and
- issuing a new payment token to the at least one digital wallet.

16. The method of claim 15,
wherein the at least one representation of the at least one payment credential comprises a graphical object representing the at least one payment credential;
wherein the at least one representation of the at least one digital wallet comprises a graphical object representing the at least one digital wallet;
wherein the at least one indication comprises a graphical link between the graphical object representing the at least one payment credential and the graphical object representing the at least one digital wallet.

17. The method of claim 16,
wherein the graphical link comprises an overlap of the graphical object representing the at least one payment credential with the graphical object representing the at least one digital wallet.

18. A computer program product for exposure reduction by token deactivation and new token issuance, whereby the computer program product provides a user a comprehensive management platform for managing multiple digital wallets and their associated payment credentials, the computer program product comprising a non-transitory computer-readable medium comprising code causing a first apparatus to:
- initiate presentation of a digital wallet management interface, comprising:
  - initiating presentation of at least one digital wallet;
  - initiating presentation of at least one representation of at least one payment credential and at least one indication of which of the at least one digital wallets are associated with each of the at least one payment credentials; and
  - initiating presentation of a travel toggle switch configured for graphical manipulation by the user between at least a first position and a second position, wherein the first position corresponds to the user not traveling and the second position corresponds to the user traveling;
- in response to the travel toggle switch moving from the first position to the second position, deactivating an original payment token; and
- issuing a new payment token to the at least one digital wallet.

19. The computer program product of claim 18,
wherein the at least one representation of the at least one payment credential comprises a graphical object representing the at least one payment credential;
wherein the at least one representation of the at least one digital wallet comprises a graphical object representing the at least one digital wallet;
wherein the at least one indication comprises a graphical link between the graphical object representing the at least one payment credential and the graphical object representing the at least one digital wallet.

20. The computer program product of claim 19,
wherein the graphical link comprises an overlap of the graphical object representing the at least one payment credential with the graphical object representing the at least one digital wallet.

* * * * *